United States Patent
Coleman et al.

(10) Patent No.: US 9,229,895 B2
(45) Date of Patent: Jan. 5, 2016

(54) MULTI-CORE INTEGRATED CIRCUIT CONFIGURABLE TO PROVIDE MULTIPLE LOGICAL DOMAINS

(75) Inventors: James A. Coleman, Mesa, AZ (US); Durgesh Srivastava, Santa Clara, CA (US); Gerald Rogers, Chandler, AZ (US); Scott M. Oehrlein, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 13/615,442

(22) Filed: Sep. 13, 2012

(65) Prior Publication Data

US 2014/0075082 A1   Mar. 13, 2014

(51) Int. Cl.
   *G06F 13/40*   (2006.01)
(52) U.S. Cl.
   CPC .... *G06F 13/4022* (2013.01); *G06F 2213/0038* (2013.01)
(58) Field of Classification Search
   CPC ... H04L 49/101; H04L 49/109; G06F 13/385; G06F 13/4022; G06F 3/0635
   USPC .................................................. 710/316, 317
   See application file for complete search history.

(56) References Cited

U.S. PATENT DOCUMENTS

| | | | | |
|---|---|---|---|---|
| 5,953,314 A * | 9/1999 | Ganmukhi et al. | ........... | 370/220 |
| 6,622,220 B2 * | 9/2003 | Yoshida et al. | ................ | 711/152 |
| 6,628,662 B1 * | 9/2003 | Blackmon et al. | ............ | 370/447 |
| 7,353,362 B2 * | 4/2008 | Georgiou et al. | ................ | 712/33 |
| 8,190,699 B2 * | 5/2012 | McMillian et al. | ........... | 709/212 |
| 8,234,435 B2 * | 7/2012 | Yoshida et al. | ................ | 710/311 |
| 8,325,194 B1 * | 12/2012 | Mrazek et al. | ................ | 345/520 |
| 8,340,088 B2 * | 12/2012 | Sindhu et al. | ................. | 370/388 |
| 8,799,697 B2 * | 8/2014 | Johnson et al. | ............... | 713/401 |
| 8,843,682 B2 * | 9/2014 | Nemawarkar | ................ | 710/240 |
| 8,886,899 B1 * | 11/2014 | Bao | ................ | 711/158 |
| 8,904,115 B2 * | 12/2014 | Chachad et al. | .............. | 711/130 |
| 2005/0097300 A1 * | 5/2005 | Gildea et al. | ..................... | 712/11 |
| 2010/0325388 A1 * | 12/2010 | Howard | .......................... | 712/29 |
| 2011/0106522 A1 * | 5/2011 | Chinya et al. | ................... | 703/28 |
| 2014/0040528 A1 * | 2/2014 | Chang et al. | .................. | 710/317 |
| 2014/0282819 A1 * | 9/2014 | Sastry et al. | ....................... | 726/1 |

OTHER PUBLICATIONS

Intel—"Intel Atom Processor Z2760—Datasheet Revision 1.0"; 150 pages, Dated Oct. 2012.*

* cited by examiner

*Primary Examiner* — Brian Misiura
(74) *Attorney, Agent, or Firm* — Schwabe, Williamson & Wyatt, P.C.

(57) ABSTRACT

Apparatuses, methods and storage media associated with integrated circuits (IC) or system-on-chips (SOC) are disclosed herein. In embodiments, a multi-core IC may include a number of central processing units (CPUs), and a number of input/output (I/O) resources. The IC may further include a switch fabric configured to couple the CPUs with the I/O resources, and a register to be selectively configured to exclusively couple one of the CPUs with one of the I/O resources to form a logical domain that computationally isolates the one CPU and the one I/O resource from other CPUs and other I/O. Other embodiments may be described and claimed.

32 Claims, 5 Drawing Sheets

MULTI-CORE INTEGRATED CIRCUIT CONFIGURABLE TO PROVIDE MULTIPLE LOGICAL DOMAINS

FIELD

Embodiments of the present invention relate generally to the technical field of integrated circuits (IC). Specific embodiments include IC or systems-on-a-chip (SOCs) containing multiple computer processing units (CPUs) configurable to form multiple isolated logical domains.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Often, applications using SOCs or integrated circuits are looking to consolidate multiple real-time workloads. These workloads often need to maintain minimum levels of determinism, latency, or jitter, and meet real-time requirements. However, a multi-core SOC with separate memory caches may experience some degree of performance degradation due to excessive input/output (I/O) requirements or memory access when the SOC is attempting to perform multiple concurrent system operations.

As an example, the SOC may attempt to perform a process related to low priority workloads at the same time as processes related to high priority latency-sensitive workloads. The low priority process could be a system maintenance operation. By contrast, the high priority latency-sensitive process could involve a process with real-time requirements such as audio or video streaming. In this instance, the low priority process could potentially interfere with the high priority latency-sensitive process, and result in increased latency or some other form of performance degradation in the high priority process.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods and storage media associated with integrated circuits (IC) or system-on-chips (SOC) are disclosed herein. In embodiments, a multi-core IC may include a number of central processing units (CPUs), and a number of input/output (I/O) resources. The IC may further include a switch fabric configured to couple the CPUs with the I/O resources, and a register to be selectively configured to exclusively couple one of the CPUs with one of the I/O resources to form a logical domain that computationally isolates the one CPU and the one I/O resource from other CPUs and other I/O.

In embodiments, registers and/or buffers may be configured to define logical channels that computationally isolate one or more CPUs, memory resources and/or I/O ports into logical domains. Each logical domain may have a guaranteed quality of service (QoS) and be masked or filtered from each other logical domain. In certain embodiments, the IC or SOC may include a north complex and a south complex, and logical channels in each complex may map to one another to extend the logical domain through both the north complex and south complex of the IC. The presence of the logical domain in both the north complex and the south complex may therefore guarantee a QoS level for a process on the IC.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
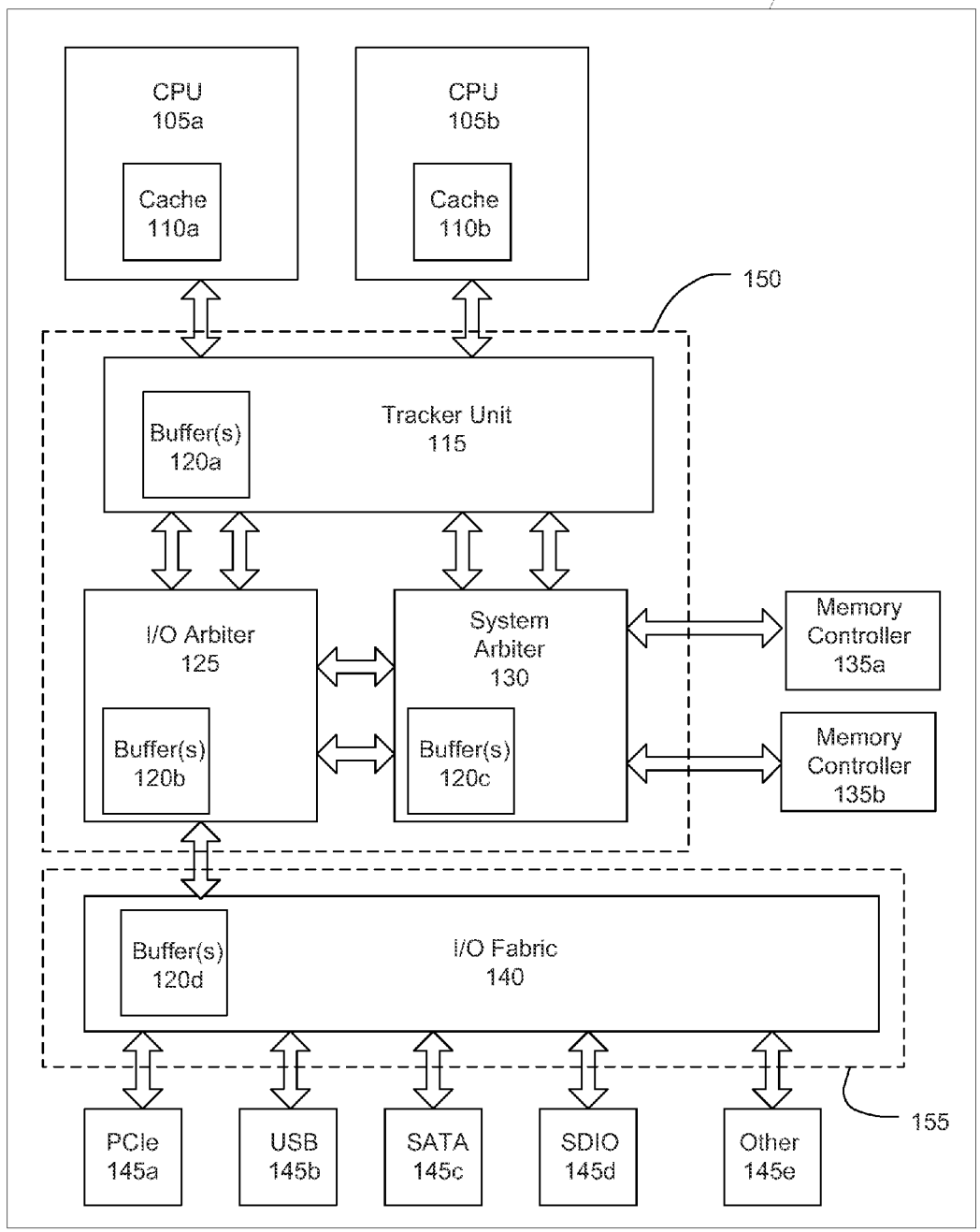
FIG. 1 schematically illustrates an example of an integrated circuit, in accordance with various embodiments.

FIG. 1 shows an integrated circuit 100 according to various embodiments of the present disclosure. In one embodiment, the integrated circuit 100 may be installed on a computing system. In another embodiment, the integrated circuit 100 may form a system-on-a-ship (SOC). Certain portions of the integrated circuit 100 will be described as hardware for the purposes of this discussion, but it will be recognized that certain elements could likewise be firmware or software without departing from the spirit or scope of the present disclosure.

The circuit 100 may generally comprise a switch fabric 102. The switch fabric may comprise a number of switches (not shown in FIG. 1) configurable to allow signals to propagate to different components communicatively coupled with the fabric. In the following description, a number of components such as CPUs, arbiters, buffers, and the like will be described as coupled with one another. One of ordinary skill in the art will understand that the coupling can be performed by selectively configuring the switch fabric 102 such that the different components can communicate with one another. Additionally, although several of the elements are shown coupled on the fabric, it will be understood that in other embodiments one or more of the components may be in communication with, but not directly coupled with, the switch fabric 102.

The circuit 100 may include a plurality of CPUs 105a, 105b. Each of the CPUs 105a, 105b may have a respective memory cache 110a, 110b. Although only 2 CPUs 105a, 105b are shown, the circuit 100 may include additional CPUs.

The CPUs 105a, 105b may be coupled with a tracker unit 115. The tracker unit 115 may serve as the primary interface to the CPUs and configured to monitor processes on the CPUs, such as data transmissions or requests. The tracker unit 115 may include one or more buffers 120a. Although the buffer(s) 120a are shown as being on the tracker unit 115, it will be recognized that the buffer(s) 120a may be physically separate from, but communicatively coupled with, the tracker unit 115.

The tracker unit 115 may be further coupled with both an input/output (I/O) arbiter 125 and a system arbiter 130. The I/O arbiter 125 may be configured to monitor and control I/O processes on the circuit 100. The system arbiter 130 may be configured to monitor system resources, such as the memory of the system. Both the I/O arbiter 125 and the system arbiter 130 may further include one or more buffer(s) 120b, 120c, respectively. The buffer(s) 120b, 120c may be directly coupled with the I/O arbiter 125 and the system arbiter 130, or they may be separate from and communicatively coupled with the I/O arbiter 125 and the system arbiter 130.

The system arbiter 130 may be communicatively coupled with a plurality of memory controllers 135a, 135b. The memory controllers 135a, 135b may be configured to monitor and control system memory resources. The memory controllers 135a, 135b are shown in FIG. 1 as separate. It will be recognized that in some embodiments the memory controllers 135a, 135b may be separately realized in individual pieces of hardware, software or firmware or, alternatively, they may be realized in the same piece of hardware, software or firmware.

The memory controllers 135a, 135b may be configured to control how information is directed and stored in memory addresses of the system memory. In some embodiments, memory controller 135a may direct a first memory resource, and memory controller 135b may direct a second memory resource. In some embodiments, the first specific memory resource may comprise a portion of system memory that is not shared with the second memory resource, and a portion of the system memory that is shared with the second memory resource. In other embodiments, the first memory resource may be completely computationally isolated from the second memory resource, as will be described in greater detail with reference to other figures.

The I/O arbiter 125 may be communicatively coupled with an I/O fabric 140. In one embodiment, the I/O fabric may be a primary scalable I/O fabric. The I/O fabric 140 may have a buffer 120d either coupled directly with the I/O fabric 140, or separated from and communicatively coupled with the I/O fabric 140.

The I/O fabric 140 may serve to route system traffic to or from a plurality of I/O ports such as a peripheral component interconnect express (PCIe) port 145a, a universal serial bus (USB) port 145b, a serial AT attachment (SATA) port 145c, a secure digital input output (SDIO) port 145d, or some other type of I/O port 145e.

Although buffers 120a-d are discussed and shown in FIG. 1, one or more of the buffers may be consolidated and therefore not present in other embodiments. For example, the buffer(s) 120a shown coupled with the tracker unit 115 may be combined with the buffer(s) 120c shown coupled with the system arbiter 130, and the combined buffer(s) may be coupled with or separate from one or the other of the tracker unit 115 and the system arbiter 130. Other buffer(s) may be similar consolidated or moved. Alternatively, additional buffer(s) may be present in the integrated circuit 100 to assist with the duties of buffer(s) 120a-d.

The integrated circuit 100 may be logically divided to include a north complex 150 comprising the tracker unit 115, the I/O arbiter 125, and the system arbiter 130, as well as their respective buffer(s) 120a, 120b and 120c. The integrated circuit 100 may be further logically divided to include a south complex 155. The switch fabric 102 may be configured such that logical channels can be created to route transmissions through the north complex between two or more of the CPUs 105a, 105b, the memory controllers 135a, 135b, and the south complex 155. Similarly the switch fabric 102 may be configured such that logical channels may be created in the south complex 155 to route transmissions from one or more of the I/O ports 145a-e to the north complex 150.

In one embodiment, the logical channels may be configured at least partially through the use of buffer(s) 120a-d. As an example, a high-priority logical channel and a low-priority logical channel may be configured. The high-priority logical channel could be associated with, for example, a real-time latency-sensitive workload performed by CPU 105a such as video streaming, and using memory controller 135a and the USB I/O port 145b. By contrast, the low-priority logical channel could be associated with routine system maintenance performed by CPU 105b and using memory controller 135b and PCIe I/O port 145a.

In this example, the traffic from CPU 105a and CPU 105b may be directed by tracker unit 115 and system arbiter 130 to memory controllers 135a and 135b to access the first memory resource and the second memory resource, respectively. The traffic related to the low-priority processes from CPU 105b may be buffered by buffer(s) 120a, 120c while the tracker 115 and the system arbiter 130 direct the traffic related to the high-priority processes on the high-priority logical channel. This logical channel may therefore allow the high-priority logical channel to transmit traffic between different components without experiencing interference or performance degradation such as jitter or latency due to the low-priority processes on the low-priority logical channel.

Further, in this example, a high-priority logical channel may be created in the south complex 155 to couple the USB I/O port 145b with the north complex 150. As shown, the south complex 155 may be coupled with the north complex 150 via a link between the I/O fabric 140 and the I/O arbiter 125. The buffer(s) 120b, 120d coupled with the I/O arbiter 125 and the I/O fabric 140, respectively, may buffer traffic between the I/O arbiter 125 and the I/O fabric 140 such that traffic related to the high-priority logical channel is transmitted while traffic related to the low-priority logical channel is buffered. The high-priority traffic may then be transmitted through the switch fabric 102 to either the CPU 105a or the memory controller 135a associated with the high-priority logical channel.

As a result of configuration of the buffer(s) 120a-d and the formation of the logical channels, each logical domain may have a guaranteed quality of service (QoS). The QoS may be measured in terms of jittery, latency, signal interruption, or some other metric. The buffer(s) 120a-d may provide this QoS for a logical domain through both the north complex 150 and the south complex 155.

Figure 2:
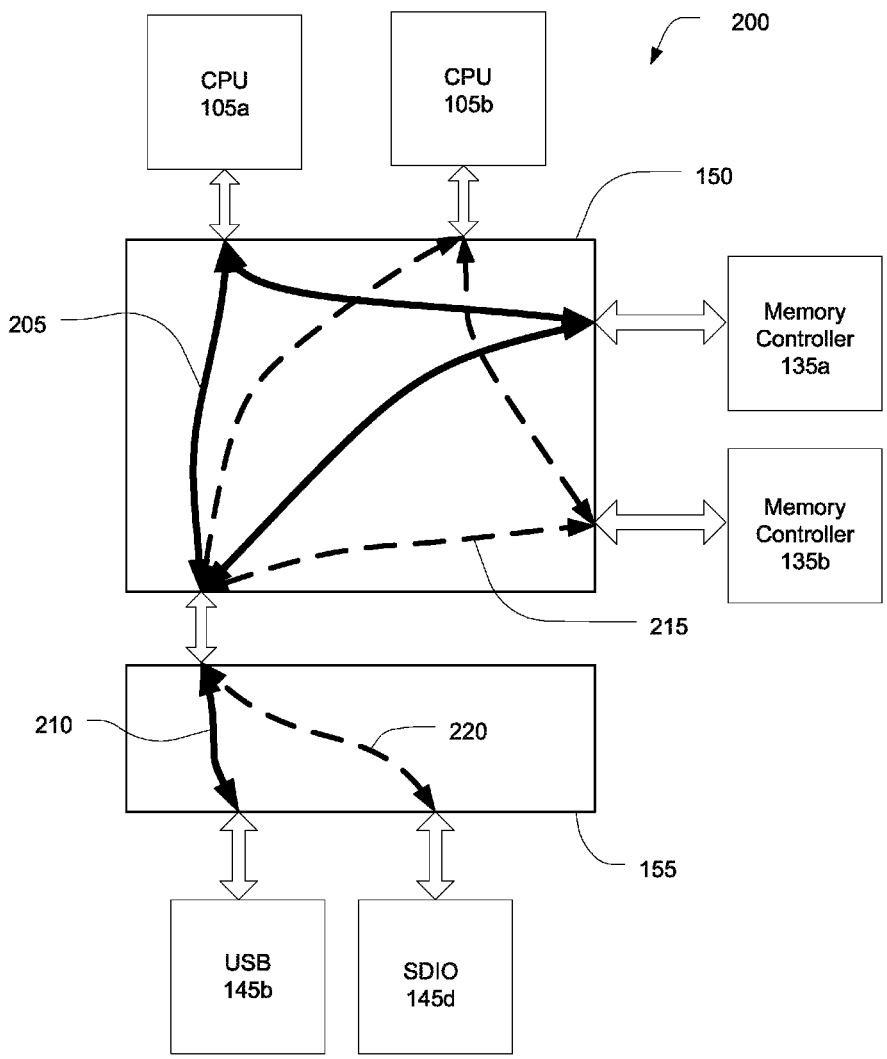
FIG. 2 illustrates a plurality of exemplary logical domains in an integrated circuit, in accordance with various embodiments.

FIG. 2 shows a high level diagram 200 of the high-priority and low priority logical channels. Specifically, a high-priority logical channel 205 in the north complex 150 may communicatively couple CPU 105a, memory controller 135a and the south complex 155. A high-priority logical channel 210 in the south complex may likewise couple the USB I/O port 145 with the north complex. The high-priority logical channel 205 in the north complex and the high-priority logical channel 210 in the south complex may correspond to, and directly communicate with, one another to form a high-priority logical domain comprising CPU 105a, memory controller 135a and USB I/O port 145b. As a result, the high-priority logical domain may be computationally isolated from other elements in the integrated circuit 100 such as the CPU 105b, the memory controller 135b, or other CPUs, memory resources, or I/O ports such as the SDIO I/O port 145d.

A second logical domain may be formed by a low-priority logical channel 215 in the north complex 150 which may communicatively couple the CPU 105b, memory controller 135b and south complex 155. A low-priority logical channel 220 in the south complex 155 may communicatively couple the SDIO I/O port 145d with the north complex 150. The low-priority logical channel 215 in the north complex 150 and the low-priority logical channel 220 in the south complex 155 may correspond to, and directly communicate with, one another to form a low-priority logical domain comprising CPU 105b, memory controller 135b, and SDIO I/O port 145d. The low-priority logical domain may be computationally isolated from other elements in the integrated circuit 100 such as the CPU 105a, the memory controller 135a, or other CPUs, memory resources, or I/O ports such as the USB I/O port 145b.

The computationally isolated logical domains may offer several benefits for the integrated circuit 100. For example, components in one logical domain may be isolated from other components in terms of latency, bandwidth and visibility. In other words, a process in a first domain may have limited or no affect on a process in another domain. Rather, a component in the first logical domain may only be able to "see" and interact with I/Os that are also assigned to that logical domain.

Additionally, traditional integrated circuits have been limited to only being able to support a single non-posted memory-mapped I/O (MMIO) transaction at a time. However, by separating the integrated circuit 100 into separate logical domains, each logical domain may be able to support a MMIO transaction at substantially the same time as a MMIO transaction in another logical domain.

In addition, significant system bandwidth may be freed up due to filtering of snoops. A snoop may be required when a process is attempting to access a memory resource. If multiple CPUs all have access to the memory resource that the process is attempting to access, then the cache of each of those CPUs must be snooped to determine whether a CPU's cache has a more recent version of the memory resource. However, in integrated circuit 100 a snoop may be filtered, or even eliminated completely, if the memory is separated into different resources that are each assigned to separate logical domains. As an example using FIG. 2, if CPU 105a is initiating a process that requires access to the unshared portion of the memory resource controlled by memory controller 135a, then a snoop of the cache 110a of CPU 105a may be filtered or eliminated.

It will be recognized that the above description is merely exemplary, and additional logical channels such as a medium-priority logical channel could be established. Additionally, the logical channels could be based on concepts other than priority level, or connect fewer or lesser components than described. As a result, the logical domains could include more or less components than described above.

Figure 3:
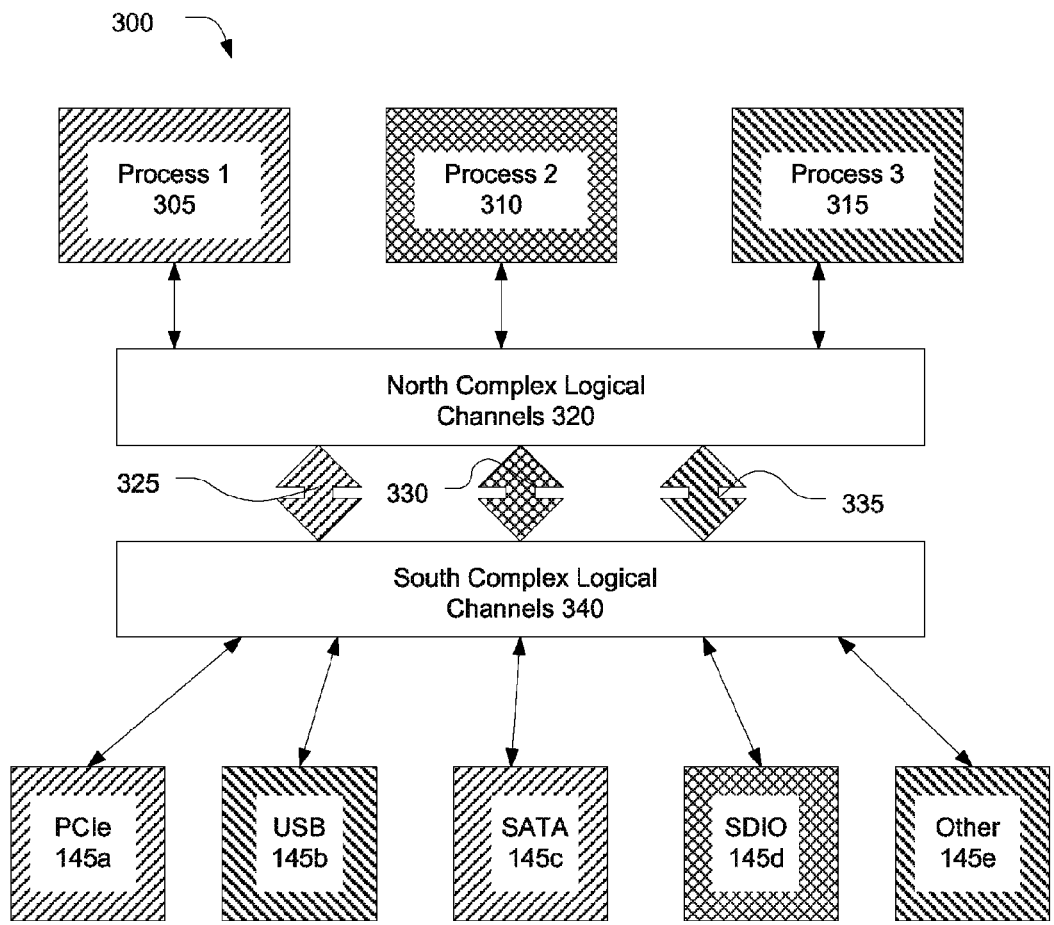
FIG. 3 illustrates exemplary operation of a plurality of logical domains in an integrated circuit, in accordance with various embodiments.

FIG. 3 depicts an example 300 showing another embodiment of the different logical domains and how the logical domains may extend between the north complex and south complex to isolate different elements in different logical domains. CPUs executing a first process 305, a second process 310 and a third process 315 may be communicatively coupled to the north complex logical channels 320. Each of the first process 305, the second process 310 and the third process 315 may relate to a different logical domain that computationally isolates the process from the other processes, and can be identified in FIG. 3 through the shading of elements in FIG. 3. The processes may be a motion control process, a process related to a human-machine interface, a process related to power-line communications, or some other type of process.

The logical domain of the first process 305 may involve both north complex logical channels 320 and south complex logical channels 340, and the north complex and south complex logical channels related to the first process 305 may directly correspond to 325, and communicate with, to one another. Similarly north and south complex logical channels for the second process 310 may likewise directly correspond to 330, and communicate with, one another, and north and south complex logical channels for the third process 315 may also directly correspond to 335, and communicate with, one another.

The logical domain for the first process 305 may then include and access a PCIe I/O port 145a and a SATA I/O port 145c. Similarly, the logical domain for the second process 310 may include and access a SDIO I/O port 145d, and the logical domain for the third process 315 may include and access a USB I/O port 145b and another I/O port 145e. These logical domains may therefore extend through the north complex logical channels 320 and the south complex logical channels 340, and computationally isolate each of the processes and I/O ports from one another.

Figure 4:
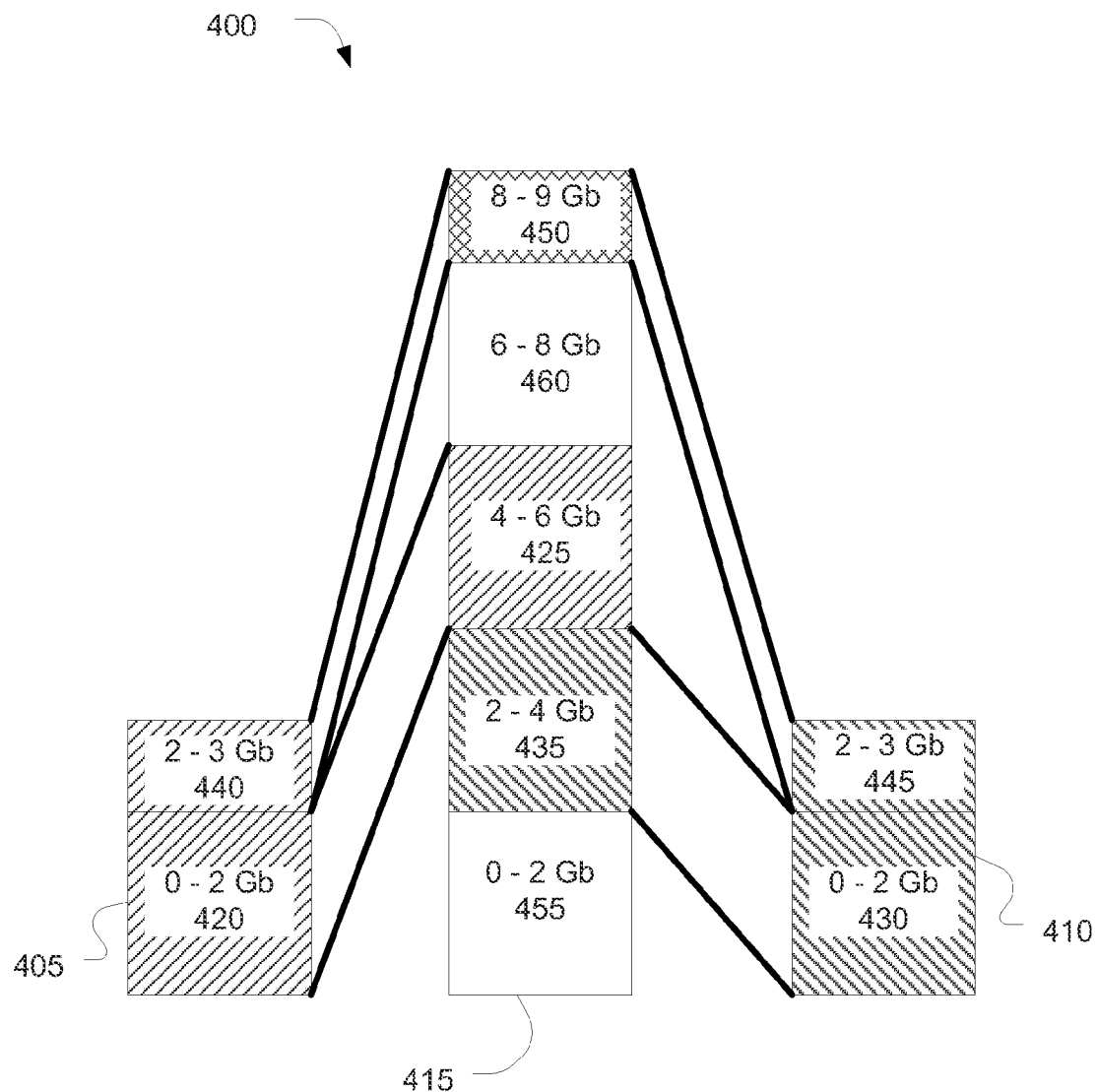
FIG. 4 illustrates an exemplary division of memory resources in an integrated circuit, in accordance with various embodiments.

FIG. 4 depicts one embodiment 400 of how memory may be allocated in the system. The memory resource 405 of a first logical domain may e.g., require 3 Gb of memory. Similarly, the memory resource 410 of a second logical domain may e.g., require 3 Gb of memory. The total system memory 415 may allow the use of 9 Gb of memory. A first portion 420 of the memory resource 405 of the first logical domain may be exclusively assigned to a memory block 425 of the system memory that has an address space ranging from 4 Gb to 6 Gb. The memory block 425 may be assigned exclusively to the first logical domain. Similarly, the first portion 430 of the memory resource 410 used by the second logical domain may be exclusively assigned to a memory block in the system memory 415 that has an address space ranging from 2 Gb to 4 Gb.

1 Gb of memory 440 of the memory resource 405 of the first logical domain and 1 Gb of memory 445 of the memory resource 410 of the second logical domain may both be assigned to a memory block 450 of the system memory 415 that has an address space ranging from 8 Gb to 9 Gb and is shared by the memory resource 405 of the first logical domain and the memory resource 410 of the second logical domain. The portion 455 of the system memory 415 with an address space between 0 Gb and 2 Gb, and the portion 460 of the system memory 415 with an address space between 6 Gb and 8 Gb may be assigned to other logical domains.

Because each logical domain may be computationally isolated from each other logical domain, the address offset of the system memory for each logical domain may be completely transparent. In other words, a CPU in the first logical domain may still access memory at memory address 0 in the memory resource 405 used by the first logical domain, regardless of which address of system memory 415 the memory resource 405 maps to.

A memory structure comprising a shared memory portion, such as the shared portion 450, may allow a CPU in one logical domain to interact with a CPU in another logical domain while still remaining computationally isolated. In other words, the CPU in one logical domain may remain computationally isolated because it can perform processes without affect the CPU in the other logical domain, but it may still access the shared portion 450 of memory to communicate with the other CPU. In one embodiment, the first CPU may make a request of the second CPU by writing an instruction in the shared portion 450 of the memory. When the second CPU checks the shared portion 450 of the memory, then the second CPU may retrieve and execute the instructions.

In another embodiment, the first CPU may write an instruction to the second CPU in the shared portion 450 of the memory, and then generate an inter-processor interrupt (IPI) or a message-signaled interrupt (MSI). In this embodiment, the MSI or IPI causes the second CPU to halt whatever process it is currently performing and retrieve the instructions from the shared portion 450 of memory. This method is similar to the method described above of the first CPU leaving the instructions for the second CPU, but here the second CPU may be directed to retrieve the instructions immediately rather than in the normal course of checking the shared portion 450 of memory. In some embodiments, the MSI or IPIs may be filtered to limit the amount that a first CPU can target or otherwise affect a second CPU.

In a third embodiment, the integrated circuit 100 may include a virtual network adapter card (NIC). The virtual NIC may be visible to each of the logical domains, and may be specifically configured to transfer information between the logical domains. As an example, the CPU in a first logical domain could transfer packets to the NIC which would then transfer the packets to a second logical domain.

It will be understood that in certain embodiments, a CPU in a logical domain may have the ability to use one or more of the shared memory, IPI, MSI or virtual NIC methods to communicate with another CPU in another logical domain. In other embodiments, a CPU's ability to communicate with another CPU in another logical domain may be filtered or otherwise restricted.

Figure 5:
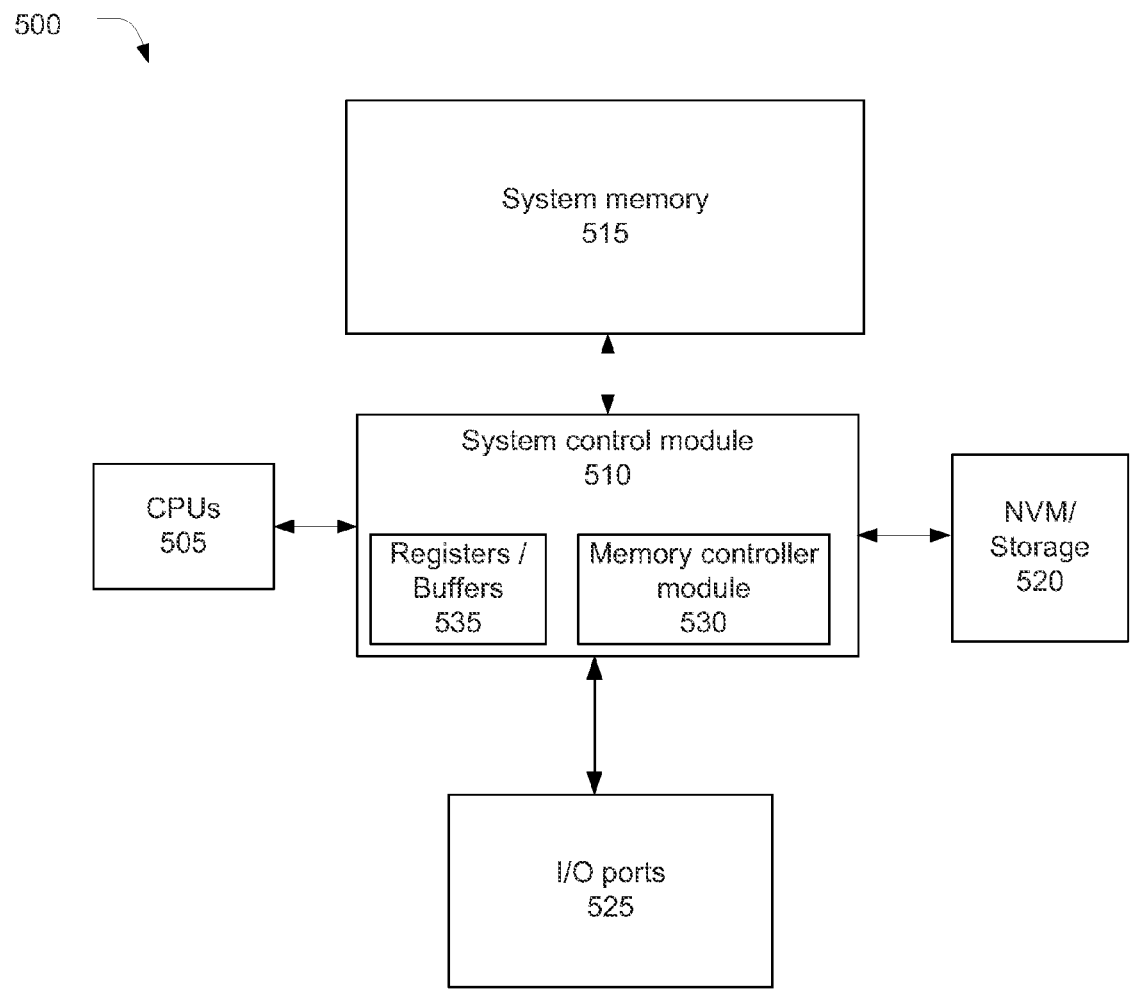
FIG. 5 illustrates a high-level schematic of an integrated circuit, in accordance with various embodiments.

FIG. 5 depicts a high level overview of other elements of the integrated circuit using any suitable hardware and/or software to configure as desired. FIG. 5 illustrates, for one embodiment, an example system 500 having a plurality of CPUs 505, system control module 510 coupled to the CPUs 505, system memory 515 coupled to system control module 510, non-volatile memory (NVM)/storage 520 coupled to system control module 510, and a plurality of I/O ports 525 coupled to system control module 510.

System control module 510 for one embodiment may include any suitable interface controllers to provide for any suitable interface to at least one of the CPUs 505 and/or to any suitable device or component in communication with system control module 510. For example, the system control module 510 may include the tracker unit 155 to interface with the CPUs 505. Additionally, the system control module 510 may include a memory controller module 530 to provide an interface to system memory 515. In one embodiment, the memory controller module may include the system arbiter 130. The memory controller module 530 may be a hardware module, a software module, and/or a firmware module.

In some embodiments, the system control module 510 may further include registers and buffers 535. The buffers may be, for example, buffers 120a-d. The registers may include registers that configure the different logical channels. For example, the registers may include the registers that allow specific CPUs, I/Os or memory resource to be assigned to the different logical channels, thereby computationally isolating or masking the different resources into the different logical domains. The registers may further include the registers that control which channels or resources an MSI or IPI are able to target. The registers may also specify how the system and different system components arbitrate the channels that allow for a balance between the high-priority process and the low-priority resources, thereby providing a guaranteed QoS for processes in the system 500.

System memory 515 may be used to load and store data and/or instructions, for example, for system 500. System memory 515 for one embodiment may include any suitable volatile memory, such as suitable DRAM, for example. In some embodiments, the system memory 515 may include double data rate type four synchronous dynamic random-access memory (DDR4 SDRAM).

System control module 510 for one embodiment may include one or more input/output (I/O) controller(s), for example the I/O arbiter 125, to provide an interface to NVM/storage 520 and communications interface(s) 525.

The NVM/storage 520 may be used to store data and/or instructions, for example. NVM/storage 520 may include any suitable non-volatile memory, such as flash memory, for example, and/or may include any suitable non-volatile storage device(s), such as one or more hard disk drive(s) (HDD (s)), one or more compact disc (CD) drive(s), and/or one or more digital versatile disc (DVD) drive(s), for example.

The NVM/storage 520 may include a storage resource physically part of a device on which the system 500 is installed or it may be accessible by, but not necessarily a part of, the device. For example, the NVM/storage 620 may be accessed over a network via the communications interface(s) 525, for example the I/O ports 145a-e.

Communications interface(s) 525 may provide an interface for system 500 to communicate over one or more network(s) and/or with any other suitable device. The system 500 may wirelessly communicate with the one or more components of the wireless network in accordance with any of one or more wireless network standards and/or protocols.

For one embodiment, at least one of the CPUs 505 may be packaged together with logic for one or more controller(s) of system control module 510, e.g., memory controller module 530. For one embodiment, at least one of the CPUs 505 may be packaged together with logic for one or more controllers of system control module 510 to form a System in Package (SiP). For one embodiment, at least one of the CPUs 505 may be integrated on the same die with logic for one or more controller(s) of system control module 510. For one embodiment, at least one of the CPUs 505 may be integrated on the same die with logic for one or more controller(s) of system control module 510 to form a System on Chip (SoC).

Embodiments may provide methods, systems or apparatuses, for example a multi-core integrated circuit, comprising a plurality of CPUs, a plurality of I/O resources, and a switch fabric coupling the plurality of CPUs with the plurality of I/O resources. The embodiments may further include a register coupled with the switch fabric that enables the switch fabric to be selectively configured to exclusively couple one of the plurality of CPUs with one of the plurality of I/O resources to form a logical domain. The logical domain may computationally isolate the one CPU and the one I/O resource from other CPUs and other I/O resources.

In some embodiments, the switch fabric may be further configured to couple the plurality of CPUs and the plurality of I/O resources with a plurality of memory resources. The embodiments may have a north complex and a south complex such that the register is further configured to enable the switch fabric to provide a first logic channel in the north complex to couple the one CPU with one of the plurality of memory resources and the south complex in the logical domain. The register may be further configured to enable the switch fabric to provide a second logic channel in the south complex to couple the one I/O resource with the north complex in the logical domain. The embodiment may further include a QoS buffer that is exclusively coupled with the logical domain and configured to provide a guaranteed QoS to a process in the logical domain.

In some embodiments, the register may be further configured to provide a third logic channel in the north complex to exclusively couple a second CPU of the plurality of CPUs with a second memory resource of the plurality of memory resources and the south complex in a second logical domain. The register may further enable the switch fabric to provide a fourth logic channel in the south complex to exclusively couple a second I/O port of the plurality of I/O resources with the north complex in the second logical domain. The second logical domain may computationally isolate the second CPU and the second I/O resource from the other CPUs and I/O resources.

In some embodiments, the first logical domain may be configured to perform processes related to high priority workloads, and the second logical domain may be configured to perform processes related to low priority workloads. Some embodiments may further comprise a first MMIO buffer configured to perform a first non-posted MMIO transaction in the first logical domain, and a second MMIO buffer configured to perform a second non-posted MMIO transaction in the second logical domain. In some embodiments, the first and second MMIO transactions may be in parallel with one another.

In some embodiments, the first memory resource may comprise a portion that is shared with the second memory resource. The first memory resource may further comprise a portion that is not shared with any other resource and is exclusively coupled with the first CPU. Similarly, the second memory resource may further comprise the shared portion and an unshared portion that is not shared with any other resource and is exclusively coupled with the second CPU. A snoop of the cache of the first CPU caused by a process may be filtered if the process is accessing the unshared portion of the first memory resource. In some embodiments, the unshared portion of the first memory resource may be at an offset memory address. The shared portion of the memory may also enable inter-domain communication between the first and second CPUs. For example, an inter-CPU interrupt arrangement, a message signaled interrupt arrangement, or a virtual network interface card configured to facilitate the inter-domain communication between the first CPU and the second CPU may exist. The register may be configured to control which of the plurality of CPUs is targetable by the inter-CPU interrupt arrangement or the message signaled interrupt arrangement.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A multi-core integrated circuit (IC) comprising:
   a computer processing unit (CPU) in a first logical division of the multi-core IC;
   an input/output (I/O) resource in a second logical division of the multi-core IC;
   a register coupled with a switch fabric to cooperate with the switch fabric for the switch fabric to:
     exclusively couple the CPU with the I/O resource to form a logical domain that computationally isolates the CPU and the I/O resource from other CPUs and other I/O resources of the multi-core IC;
     provide a first logical channel in the first logical division to couple the CPU with a memory resource in the first logical division in the logical domain; and
     provide a second logical channel in the second logical division to couple the I/O resource with the first logical division in the logical domain.

2. The multi-core IC of claim 1, further comprising a quality of service (QoS) buffer exclusively coupled with the logical domain, the QoS buffer to provide a guaranteed QoS to a process in the logical domain.

3. The multi-core IC of claim 1, wherein the CPU is a first CPU of a plurality of CPUs, the I/O resource is a first I/O resource of a plurality of I/O resources, the memory resource is a first memory resource, and the logical domain is a first logical domain, and wherein the register is to further cooperate with the switch fabric for the switch fabric to:
   selectively provide a third logic channel in the first logical division to exclusively couple a second CPU of the plurality of CPUs with a second memory resource of the plurality of memory resources and the second logical division in a second logical domain; and
   selectively provide a fourth logic channel in the second logical division to exclusively couple a second I/O port of the plurality of I/O resources with the first logical division in the second logical domain;
   wherein the second logical domain computationally isolates the second CPU and the second I/O resources from the other CPUs and I/O resources.

4. The multi-core IC of claim 3, wherein the first logical domain is to perform processes related to high priority workloads, and the second logical domain is to perform processes related to low priority workloads.

5. The multi-core IC of claim 3, further comprising a first memory mapped I/O (MMIO) buffer to perform a first non-posted MMIO transaction in the first logical domain and a second MMIO buffer to perform a second non-posted MMIO transaction in the second logical domain in parallel with the first non-posted MMIO transaction.

6. The multi-core IC of claim 3, wherein the first memory resource comprises a portion shared with the second memory resource, and another portion not shared with any other memory resource; and the second memory resource comprises a portion shared with the first memory resource and another portion not shared with any other memory resource; wherein the portion of the first memory resource not shared with any other memory resource is exclusively coupled with the first CPU, and the portion of the second memory resource not shared with any other memory resource is exclusively coupled with the second CPU.

7. The multi-core IC of claim 6, wherein a snoop of a cache of the first CPU caused by a process is filtered if the process is accessing the unshared portion of the first memory resource.

8. The multi-core IC of claim 6, wherein the portion of the first memory resource not shared with any other memory resource is at an offset memory address in the plurality of memory resources.

9. The multi-core IC of claim 6, wherein the shared portion between the first and second memory resources enables inter-domain communication between the first CPU and the second CPU.

10. The multi-core IC of claim 9, further comprising an inter-CPU interrupt arrangement, a message signaled interrupt arrangement, or a virtual network interface card (NIC) to facilitate the inter-domain communication between the first CPU of the first logical domain and the second CPU of the second logical domain.

11. The multi-core IC of claim 10, wherein the register is further to control which of the plurality of CPUs is targetable by the inter-CPU interrupt arrangement or the message signaled interrupt arrangement.

12. A method comprising:
identifying a first memory resource comprising a shared memory portion and a first unshared memory portion in a plurality of memory resources, the first memory resource in a first logical division of a multi-core integrated circuit (IC);
identifying a second memory resource comprising the shared memory portion and a second unshared memory portion in the plurality of memory resources, the second memory resource in the first logical division;
identifying a first computer processing unit (CPU) and a second CPU in a plurality of CPUs in the first logical division;
coupling the first CPU with the first memory resource via a logical channel in the first logical division of a switched fabric, wherein coupling the first CPU with the first memory resource forms a logical domain that computationally isolates the first CPU and the first unshared memory portion from the second CPU and the second unshared memory portion;
identifying one input/output (I/O) resource of a plurality of I/O resources in a second logical division of the switched fabric; and
coupling the one I/O resource with the first CPU and the first memory resource in the logical domain via a second logical channel in the second logical division, the second logical channel to couple the one I/O resource with the first logical division, wherein the second logical channel computationally isolates the I/O resource from other I/O resources in the plurality of I/O resources.

13. The method of claim 12, and further comprising facilitating an inter-domain communication between the first CPU and the second CPU via an inter-CPU interrupt arrangement, a message signaled interrupt arrangement, or a virtual network interface card (NIC).

14. The method of claim 13, and further comprising controlling targeting of one of the first CPU and the second CPU by the inter-CPU interrupt arrangement or the message signaled interrupt arrangement via a register.

15. The method of claim 12, wherein a memory address of the first unshared memory portion is offset in the plurality of memory addresses of the plurality of memory resources.

16. The method of claim 12, and further comprising filtering a snoop of a cache of the first CPU caused by a process if the process is accessing the unshared portion of the first memory resource.

17. The method of claim 12, and further comprising controlling a quality of service (QoS) of processes in the logical domain via one or more buffers.

18. The method of claim 12, wherein the logical channel is a first logical channel in the first logical portion and is to further couple the first CPU and the first memory resource with the second logical portion, and further comprising the steps of:
identifying one input/output (I/O) resource of a plurality of I/O resources; and
coupling the one I/O resource with the first CPU and the first memory resource in the logical domain via a second logical channel in the second logical portion, the second logical channel to couple the one I/O resource with the first logical portion, wherein the second logical channel computationally isolates the I/O resource from other I/O resources in the plurality of I/O resources.

19. The method of claim 12, wherein the I/O resource is a first I/O resource and the logical domain is a first logical domain, and further comprising:
identifying a second I/O resource in the plurality of I/O resources;
coupling the second CPU with the second memory resource via a third logical channel in the switched fabric to create a second logical domain that computationally isolates the second CPU and the second unshared memory portion from the first CPU and the first unshared memory portion, the third logical channel being in the first logical portion of the multi-core IC and coupling the second CPU with the second memory resource and the second logical portion in the second logical domain; and
coupling the second I/O resource with the first logical portion of the multi-core IC in the second logical domain via a fourth logical channel in the second logical portion, the fourth logical channel to computationally isolate the second I/O resource from the other I/O resources in the plurality of I/O resources.

20. The method of claim 19, wherein the first CPU performs processes related to high priority workloads, and the second CPU performs processes related to low priority workloads.

21. The method of claim 19, and further comprising:
performing a first non-posted memory mapped I/O (MMIO) transaction in the first logical domain; and
performing a second non-posted MMIO transaction in the second logical domain at least partially at the same time as the first MMIO transaction.

22. One or more computer readable media having instructions that, in response to execution by a system, cause the system to:
exclusively couple one of a plurality of computer processing units (CPUs) in a first logical portion of the system with one of a plurality of input/output (I/O) resources in a second logical portion of the system to form a logical domain in a switch fabric, the logical domain computationally isolating the one CPU and the one I/O resource from other CPUs in the plurality of CPUs and other I/O resources in the plurality of I/O resources; and couple, via the logical channel in the first logical portion, the one CPU with a memory resource in a plurality of memory resources in the first logical portion to include the one memory resource in the logical domain.

23. The one or more computer readable media of claim 22, wherein the instructions, in response to execution by the system, further cause the system to guarantee a quality of service (QoS) to a process in the logical domain via one or more buffers, the buffers operable to selectively transmit data between the one CPU, the one I/O resource, and the one memory resource in the logical domain.

24. The one or more computer readable media of claim 22, wherein the logical channel is a first logical channel to couple the one CPU and the one memory resource with the second logical portion in the logical domain; and the second logical portion comprises a second logical channel to couple the one I/O resource with the first logical portion in the logical domain.

25. The one or more computer readable media of claim 22, wherein the one CPU is a first CPU of the plurality of CPUs, the one I/O resource is a first I/O resource of the plurality of I/O resources, the one memory resource is a first memory resource, and the logical domain is a first logical domain, and the instructions, in response to execution by the system, further cause the system to:

exclusively couple a second CPU of the plurality of computer processing units (CPUs) with a second I/O resource of the plurality of input/output (I/O) resources via a second logical domain that computationally isolates the second CPU from the other CPUs in the plurality of CPUs and the other I/O resources in the plurality of I/O resources; and couple the second CPU with a second memory resource in the plurality of memory resources via a third logical channel in the second logical domain to include the second memory resource in the second logical domain.

26. The one or more computer readable media of claim 25, wherein the first logical domain is to perform high priority processes, and the second logical domain is to perform low priority processes.

27. The one or more computer readable media of claim 25, wherein the instructions, in response to execution by the system, further cause the system to:

perform a first non-posted memory mapped I/O (MMIO) transaction in a first MMIO buffer in the first logical domain; and perform, in parallel with the first MMIO transaction, a second MMIO transaction in a second MMIO buffer in the second logical domain.

28. The one or more computer readable media of claim 25, wherein the first memory resource comprises a portion shared with the second memory resource, and another portion not shared with any other memory resource; and the second memory resource comprises a portion shared with the first memory resource and another portion not shared with any other memory resource;

wherein the shared portion between the first and second memory resources enable inter-domain communication between the first CPU of the first logical domain and the second CPU of the second logical domain.

29. The one or more computer readable media of claim 28, wherein the instructions, in response to execution by the system, further cause the system to filter a snoop of a cache of a first CPU caused by a process if the process is accessing the unshared portion of the first memory resource.

30. The one or more computer readable media of claim 28, wherein the portion of the first memory resource not shared with any other memory resource is at a memory address that is offset in the plurality of memory resources.

31. The one or more computer readable media of claim 25, wherein the instructions, in response to execution by the system, further cause the system to facilitate inter-domain communication between the first CPU of the first logical domain and the second CPU of the second logical domain via an inter-CPU interrupt arrangement, a message signaled interrupt arrangement, or a virtual network interface card (NIC).

32. The one or more computer readable media of claim 31, wherein the instructions, in response to execution by the system, further cause the system to control which of a plurality of CPUs is targetable by the inter-CPU interrupt arrangement or the message signaled interrupt arrangement via a register.

* * * * *